United States Patent [19]

Woo

[11] Patent Number: 5,047,878
[45] Date of Patent: Sep. 10, 1991

[54] SCREEN ENCORE METHOD FOR A VTR

[75] Inventor: Jong-Sam Woo, Seoul, Rep. of Korea

[73] Assignee: SamSung Electronics Co., Ltd., Kyung Ki-Do, Rep. of Korea

[21] Appl. No.: 412,004

[22] Filed: Sep. 25, 1989

[30] Foreign Application Priority Data

Dec. 8, 1988 [KR] Rep. of Korea ............... 1988-16326

[51] Int. Cl.$^5$ .............................................. G11B 15/18
[52] U.S. Cl. ...................................... 360/69; 360/137
[58] Field of Search .................................. 360/64, 137

*Primary Examiner*—John H. Wolff
*Attorney, Agent, or Firm*—Bushnell, Robert E.

[57] ABSTRACT

There is disclosed a screen encore method capable of re-playing the exact portion to be watched again by using a counter module. The improved VTR system for performing the screen encore method includes: a microcomputer 1 which controls the system; a tape counter module 2 which checks the running status of a tape and informs the user of the tapes processing condition; a display 3 showing the present status of the VTR according to user key input; a Y/C unit 4 which performs circuit level functions of a VTR such as the video or audio signal processing; a logic and mechanism unit 5 which performs the mechanical functions of a VTR such as insertion and ejection of tape, loading, and unloading; a sensor and remote control unit 6 which deliver the present status of a VTR such as program switch (=position switch), start/end sensor, and reel and drum pulse, to the microcomputer, and also deliver the remotely received control signal; and a keyboard 7 which delivers information to said microcomputer in order to achieve the function desired by a user and by which a desired function key is selected and entered.

3 Claims, 4 Drawing Sheets

SCREEN ENCORE METHOD FOR A VTR

BACKGROUND OF THE INVENTION

This invention relates to a reproducing function of a VTR system and, in more particular, to a screen encore method using counter module means.

In case when a user watches the play picture of a VTR, and when the user may want to watch the immediately previous pictures or the pictures located long time before the current picture, several key operations according to that are required.

That is to say, in case of watching the previous pictures, cumbersome key operations to stop the VTR in playing, to rewind (hereafter referred to as REW) until the memory counter stops, and to play again, must be performed. Therefore, because of the time required to said for these several key operations, the disadvantage of a long delay while awaiting execution of an encore function (i.e., the replay of pictures passed before) has resulted.

SUMMARY OF THE INVENTION

It is accordingly an object of this invention to provide a screen encore method capable of replaying the exact portion of an immediately previous picture which a viewr desires to watch again, by using counter module means.

According to one aspect of invention, an embodiment of an inventive VTR system for performing the screen encore method includes: a microcomputer which controls the system; a tape counter module for checking the running status of a tape and informs the user of processing condition; a showing display the present status of VTR according to the user key input; a Y/C unit which performs the circuit level function of a VTR such as video or audio signal processing; a logic and mechanism unit which perform the mechanical function of a VTR such as insertion and injection of tape, loading, and unloading; a sensor and remote control unit providing the present status of a VTR such as program switch (=position switch), start/end sensor, and reel and drum pulse, to the microcomputer, and also delivers the remotely received control signal; and a keyboard which has a portion to deliver information to the microcomputer in order to achieve the function desired by a user, by which a desired function key is selected and entered.

BRIEF DESCRIPTION OF THE DRAWINGS

For a better understanding of the invention and to show how the same may be carried into effect, reference will now be made, by way of example, to the accompanying diagrammatic drawings, in which.

DETAILED DESCRIPTION OF THE INVENTION

The preferred embodiment of the invention will now be described in detail, with reference to the accompanying drawings, by way of an example.

Figure 1:
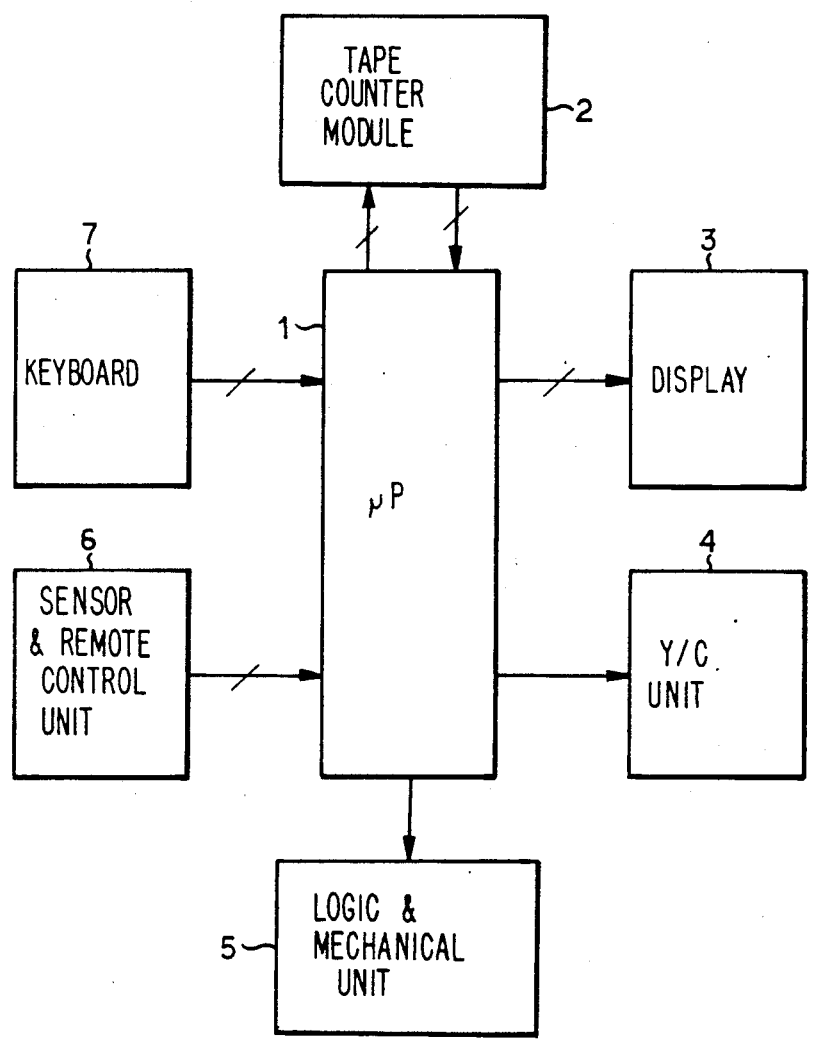
FIG. 1 is a system block diagram of the present invention.

Referring now to FIG. 1, it is a block diagram according to the present invention, in which the invention, for convenience, includes:

a microcomputer 1 which controls the system;

tape counter module 2 which checks the running status of a tape and informs the user of processing condition;

a displays for representing the present status of VTR according to the user key input;

a Y/C unit 4 which performs circuit level function of a VTR such as the video or audio signal processing;

a logic and mechanical unit 5 which perform the mechanical functions of a VTR such as insertion and ejection of tape, loading, and unloading;

a sensor and remote control unit 6 which deliver the present status of a VTR such as program switch (=position switch), start/end sensor, and reel and drum pulse, to microcomputer 1, and also deliver the remotely received control signal; and a keyboard 7 which delivers information to said microcomputer 1 in order to achieve the function desired by a user and by which a desired function key is selected and applied to the microcomputer 1

Figure 3:
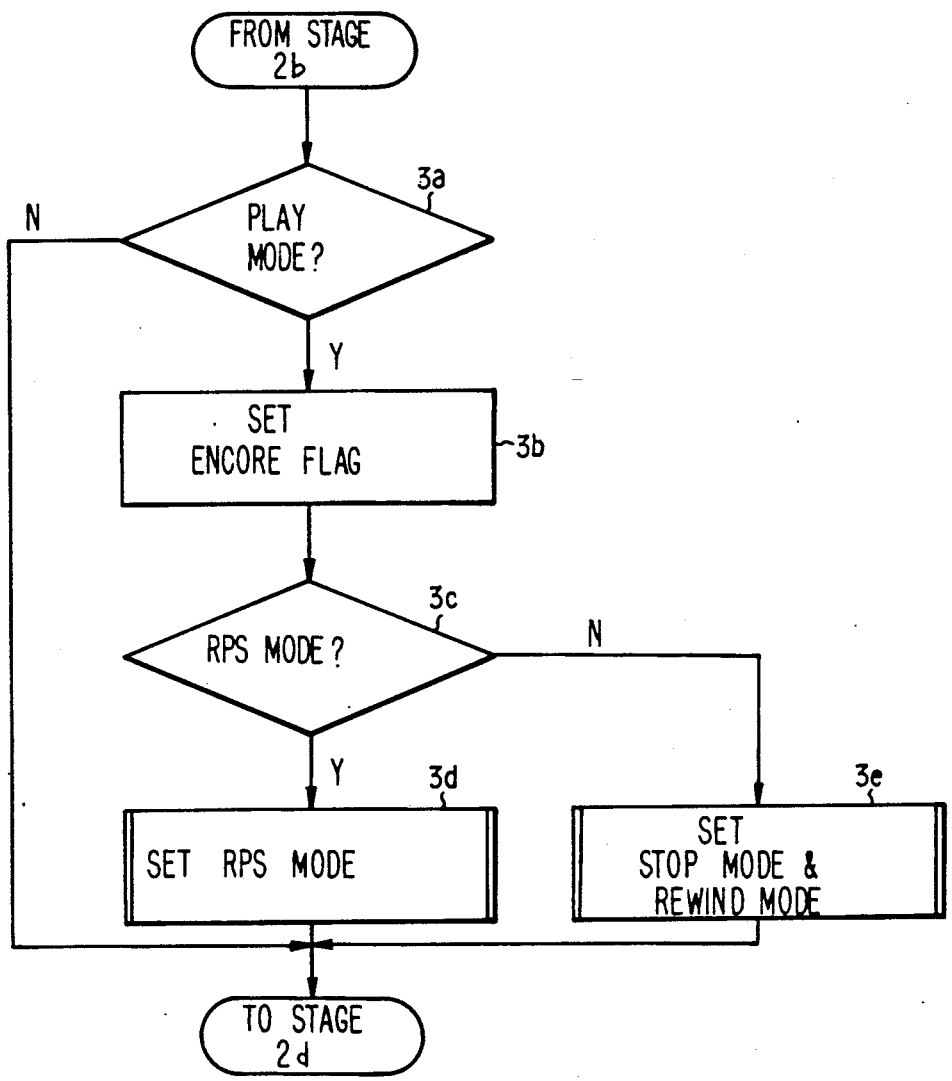
FIG. 3 is a flow diagram for the encore processing of the present invention.
Figure 4:
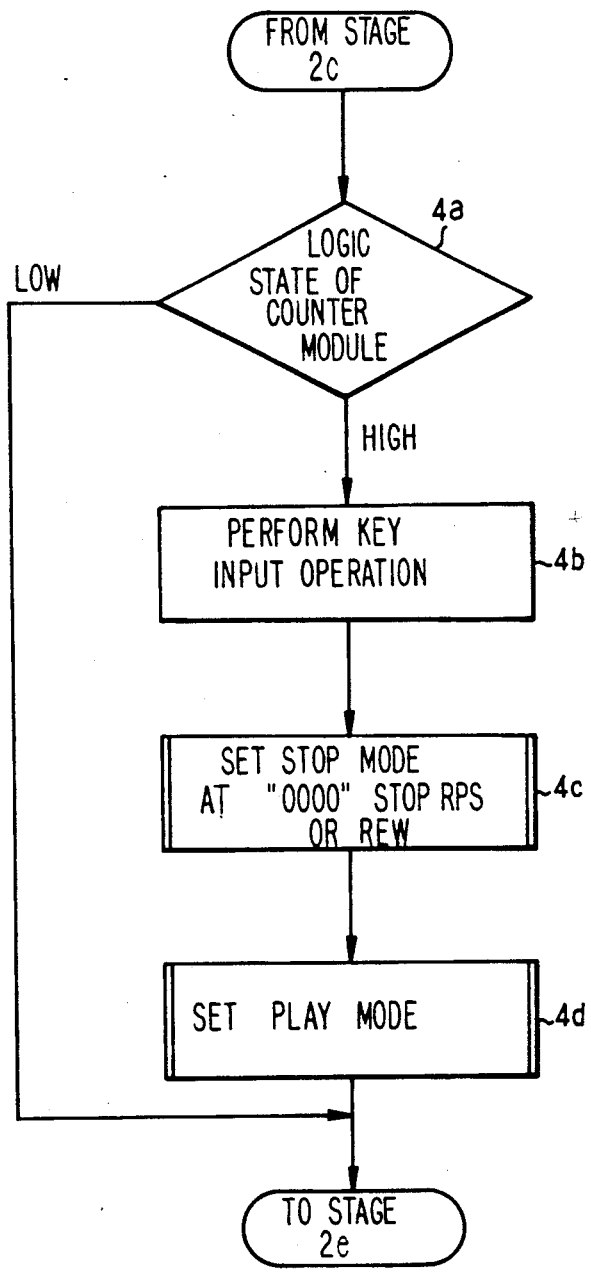
FIG. 4 is a flow diagram for the counter module sensing of the present invention.

In the accompanying drawings; there is shown a flow chart diagram for the general operation of a VTR in FIG. 1, a flow chart diagram for an encore function processing routine in FIG. 3, and a flow chart diagram for counter module sensing routine in FIG. 4.

Figure 2:
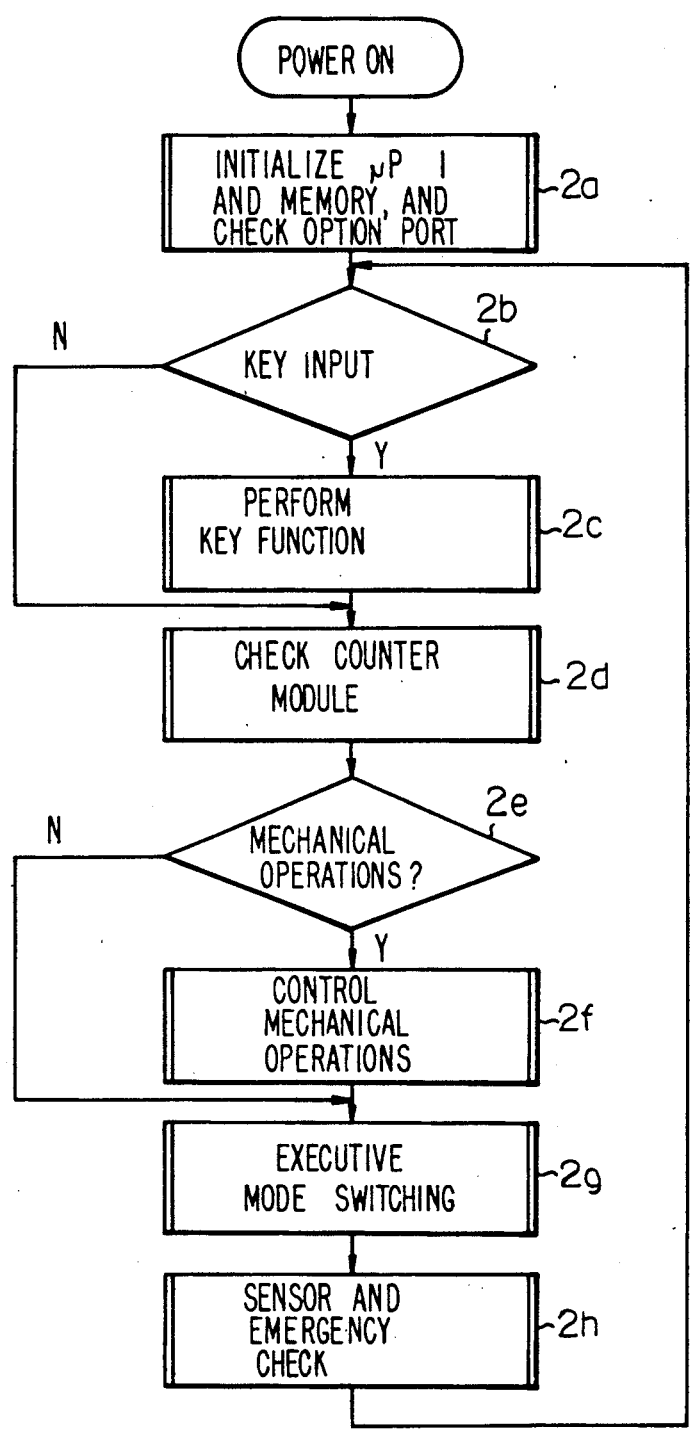
FIG. 2 is a flow diagram for the VTR operation of the present invention.

Referring now to FIG. 2, the flow chart for general operation of a VTR is described in the following manner. After the power-on, at stage 2a, the I/O port of microcomputer 1 and the content of the random access memory (i.e., a "RAM") included within computer 1 are initialized, the initial values are set, and the interrupts are controlled. At the same time, it checks the option port to determine the rewind picture search (hereafter referred to as RPS) or the REW.

After performing stage 2a, at stage 2b, microcomputer 1 scans the keyboard 7 or checks the presence of input of panel key or remote commander key through the sensor and remote control unit 6.

As a result of the check, if there exists a key input, the key function corresponding to the key characteristics entered is performed at stage 2c. For example, if there exists a power key input at said stage 2b, the power-on operation will be executed at stage 2c, and if there exists an encore key input at stage 2b, corresponding key processing routine will be invoked.

After performing said stage 2c, what the present mode of the system will be checked at stage 2d. After performing said stage 2d, whether the mode accompanies mechanical operations will be discriminated at stage 2e. In case of an accompanying mechanical operation, it controls the mechanism at stage 2f and proceeds to stage 2g to execute the mode switching.

After performing said stage g and when in a stable mode, it executes the sensor and emergency check at stage 2h. That is to say, it checks the sensor, which detects the start or end of a tape according to the mode and detects the reel or drum pulse, to check whether the set is operating in normally. If it is not operating normally, an emergency process for system stabilization will be executed.

If a user want to use the encore function while performing the operation of a VTR, represented by FIG. 2, the user would reset the counter module 2 at the desired position while playing the tape and then press a counter memory key. In this case, the counter memory key represents a key at the counter module 2.

Therefore, after performing the preceding operation, if a user presses the encore key while playing the picture to watch the previous pictures, key scan is executed at stage 2b of FIG. 2 and it proceeds to stage 2c to execute the encore function processing routine in FIG. 3. Since the encore function key operation is possible only in the play mode, the present mode will be checked at stage 3a to test whether it is in the play mode. If the test result is the play mode, the encore flag will be set at stage 3b and the option test will be performed at stage 3c. If it is proved to be the RPS mode, it will proceed to stage 3d to set the reverse picture scan (i.e., "RPS") mode and otherwise, it will set the STOP mode at stage 3e and also set the REW mode.

After performing said stages 3a–3e, it proceeds to stage 2d. At this time it performs a sequence of the encore function operation, which rewinds the tape to the position where the counter module means reaches to "0000" and plays again, by setting the next operation to RPS mode at play mode with the option-checked status or by setting the mode from STOP to REW. The sensing method for the counter module is are depicted in FIG. 4.

While operating the main loop of FIG. 2, the counter module means are checked at stage 4a. In case of logic low state, the main loop function continues to execute. But in case of logic high state, the counter operation is performed at stage 4b. If said counter reaches "0000", it sets the STOP mode at stage 4c and stops RPS or REW operation which is used to search the starting point to be encored to terminate the counter memory. At stage 4d, it sets the play mode again.

Then, at stage 2d, it checks the mode to perform the above-mentioned sequence of procedures. At said stage 4b, if there exists any other key input while performing RPS or REW, the key operation corresponding to the key input entered will be performed. If there exists encore key input again, it performs RPS or REW until there occurs a response from the counter module means, and then starts the play mode.

In summary, the process for obtaining a screen encore in a video tape recorder having a microcomputer and a tape counter mdoule, includes a first step which initializes all ports and the content of a ram at a power-on-reset, sets the initial values, controls interrupts, and at the same time, checks an option port to determine selection of a rewind picture search or rewind mode; a second step which checks for the presence of an encore key input and then processes an encore key function; a third step which checks the mode, and, if the present mode is accompanied by a mechanism operation, controls the mechanism operation; and a fourth step which switches the mode and checks the sensor and emergency to stabilize the system. The second step may include a first step which checks whether the present mode is play mode; a second step which sets an encore flag if the first step is the play mode, and tests the option to check whether the result is a rewind picture search mode; a third step which sets the rewind picture search mode if the result of the second step is the rewind picture search mode or sets a step mode if the result of the second step is not rewind picture seach mode, and sets the rewind mode; and a fourth step which, if the counter module is in logic high status during operation of the second and third steps, performs counting operations, and sets the stop mode and then sets the play mode.

As a different method from the foregoing one, the response can be accomplished by connecting the counter module response pin to the external interrupt pin.

As described above, without adding external hardware or modifying the PCB, the user can watch the desired portion of tape by modifying the software only. Hence it results in some advantages and is capable of obtaining not only superior functionality but also the effect of quality improvement.

Although specific constructions and procedures of the invention have been illustrated and described herein, it is not intended that the invention be limited to the elements and constructions disclosed. one skilled in the art will easily recognize that the particular elements or subconstructions may be used without departing from the scope and spirit of the invention.

What is claimed is:

1. A screen encore method in a video tape recorder including a microcomputer and counter module means, said method comprising:
    a first step which initializes all ports and the content of a ram at a power-on-reset, sets the initial values, controls interrupts, and at the same time, checks an option port to determine a rewind picture search or rewind mode;
    a second step which checks the presence of an encore key input and then processes an encore key function;
    a third step which checks the mode, and, if the present mode accompanies a mechanism operation, controls the mechanism operation; and
    a fourth step which switches the mode and checks the sensor and emergency to stabilize the system.

2. The screen encore method according to claim 1, wherein said second step comprises:
    a first sub-step which checks whether the present mode is a play mode;
    a second sub-step which sets an encore flag is said first sub-step is the play mode, and tests the oprtion port to obtain a result indicating whether a key input has been selected a rewind picture search mode;
    a third sub-step which sets the rewind picture search mode if said result indicates selection of the rewind picture search mode or sets a stop mode if said result does not indicate selection of the rewind picture search mode, and sets the rewind mode; and
    a fourth sub-step which, if the portion of the counter module means are in logic high status during operating said second and third sub-steps, perform a counting operation to set the stop mode and then sets the play mode.

3. A process for obtaining an encore of a video display from a video tape recorder, comprising:
    initializing the content of the memory of a controller in response to occurrence of a power-on-reset condition;
    determining whether a key input for one of a reverse picture search mode and a rewind mode, has been received;
    determining whether an encore function has been selected;
    identifying a current operational mode of the video tape recorder;
    determining whether said current operational mode requires operation of a component of the video tape recorder; and
    controlling said operation if said current operational mode requires operation of a component of the video tape recorder.

* * * * *

UNITED STATES PATENT AND TRADEMARK OFFICE
CERTIFICATE OF CORRECTION

PATENT NO. : 5,047,878
DATED : September 10, 1991
INVENTOR(S) : Jong-Sam WOO It is certified that error appears in the above-identified patent and that said Letters Patent is hereby corrected as shown below:

ON THE TITLE PAGE:

IN THE ABSTRACT

Column 2, Line 4, change "tapes" to --tape's--;

Line 7, change "of" to --for--.

Column 1, Line 17, delete "to";

Line 18, delete "said";

Line 28, change "viewr" to --viewer--;

Line 35, change "showing display" to --display showing--;

Line 39, delete "the", and change "function" to --functions--;

Line 40, change "injection" to --ejection--;

Column 2, Line 8, change "displays" to --display--;

Line 10, change "function" to --functions--;

Line 13, delete "the";

Line 16, change "deliver" to --delivers--;

Line 19, change "deliver" to --delivers--;

Line 21, delete "said".

UNITED STATES PATENT AND TRADEMARK OFFICE
CERTIFICATE OF CORRECTION

PATENT NO. : 5,047,878
DATED : September 10, 1991
INVENTOR(S) : Jong-Sam WOO It is certified that error appears in the above-identified patent and that said Letters Patent is hereby corrected as shown below:

Column 2, Line 25, delete ";";

Line 27, change "1" to --2--;

Line 29, insert --a-- after "for";

Line 46, delete "said";

Line 48, insert --a-- before "corresponding";

Line 50, delete "said";

Line 52, delete "said";

Line 57, change "g" to --2g--;

Line 62, delete "in";

Line 65, change "want" to --wants--;

Line 67, change "would" to --should--;

Column 3, Line 13, change "RPS" to --reverse picture scan (i.e. "RPS")--;

Line 14, change "the reverse picture scan (i.e. "RPS") to --RPS--;

Line 16, delete "said";

Line 20, delete "to", and insert --the tape-- after "plays";

Line 23, delete "are".

UNITED STATES PATENT AND TRADEMARK OFFICE
CERTIFICATE OF CORRECTION

PATENT NO. : 5,047,878

DATED : September 10, 1991

INVENTOR(S) : Jong-Sam WOO

It is certified that error appears in the above-identified patent and that said Letters Patent is hereby corrected as shown below:

Column 3,     Line 35,     delete "said";

Line 44,     change "mdoule" to --module--;

Line 67,     change "As" to --In--.

IN THE CLAIMS

Column 4,     Claim 2,     Line 35,     change "is" to --if--.

Signed and Sealed this

Seventh Day of January, 1992

Attest:

HARRY F. MANBECK, JR.

*Attesting Officer*           *Commissioner of Patents and Trademarks*